United States Patent [19]
Hill

[11] Patent Number: 6,086,092
[45] Date of Patent: Jul. 11, 2000

[54] INFLATABLE VEHICLE OCCUPANT PROTECTION DEVICE

[75] Inventor: Bruce Hill, Bloomfield Hills, Mich.

[73] Assignee: TRW Vehicle Safety Systems Inc., Lyndhurst, Ohio

[21] Appl. No.: 09/111,299

[22] Filed: Jul. 7, 1998

[51] Int. Cl.$^7$ ................................................. B60R 21/24
[52] U.S. Cl. ...................................... 280/729; 280/743.2
[58] Field of Search .................................. 280/729, 743.2

[56] References Cited

U.S. PATENT DOCUMENTS

| | | | |
|---|---|---|---|
| 3,752,501 | 8/1973 | Daniel et al. | 280/729 |
| 5,078,423 | 1/1992 | Fujita | 280/743.2 |
| 5,249,824 | 10/1993 | Swann et al. | 280/729 |

FOREIGN PATENT DOCUMENTS 1311930   6/1988   Japan .

*Primary Examiner*—Kenneth R. Rice
*Attorney, Agent, or Firm*—Tarolli, Sundheim, Covell, Tummino & Szabo L.L.P.

[57] ABSTRACT

An inflatable vehicle occupant protection device (10) comprises an outer bag (40) comprising an outer panel (42) and an inner panel (44) sewn together along their outer peripheral portions by an external seam (70). The inner panel (44) of the outer bag (40) has a first mouth portion (66) fixable on the vehicle. The outer panel (44) of the outer bag (40) has an occupant contact portion (54) opposite the first mouth portion (66) which is movable in a first direction away from the first mouth portion upon inflation of the outer bag. An inner bag (30) located within the outer bag (40) comprises an outer panel (32) and an inner panel (34) sewn together along their outer peripheral portions by an external seam (100). The inner panel (34) of the inner bag (30) has a second mouth portion (86) fixable on the vehicle. The outer panel (32) of the inner bag (30) has an outer portion (74) opposite the second mouth portion (86) which is movable in the first direction away from the second mouth portion upon inflation of the inner bag. The second mouth portion (86) of the inner bag (30) has an inflation fluid inlet opening (88) extending around an axis (20, 52) of the second mouth portion for enabling inflation fluid to flow into the inner bag in the first direction. The outer bag (40) is inflated only by inflation fluid which first flows into the inner bag (30). The inner bag (30) has fluid vent means (90) for directing inflation fluid to flow out of the inner bag and into the outer bag (40) only in directions which are outward from the axis (20, 52) and in a direction away from the occupant contact portion (54) of the outer bag. In a preferred embodiment, an area (112) of the outer portion (74) of the inner bag (30) engages an area (110) of the occupant contact portion (54) of the outer bag (40) to block the flow of inflation fluid between the area (110) of the outer bag and the area (112) of the inner bag.

9 Claims, 4 Drawing Sheets

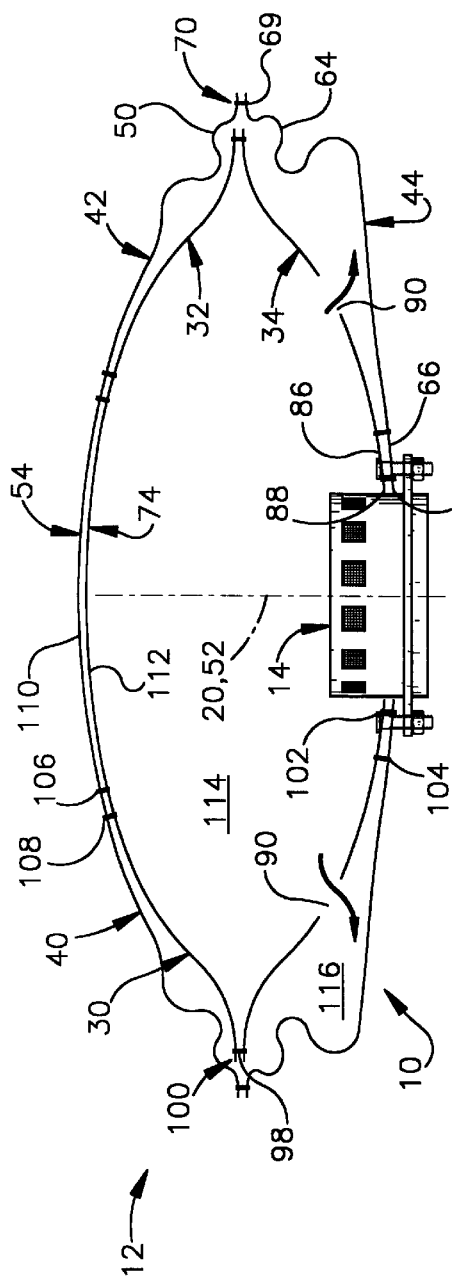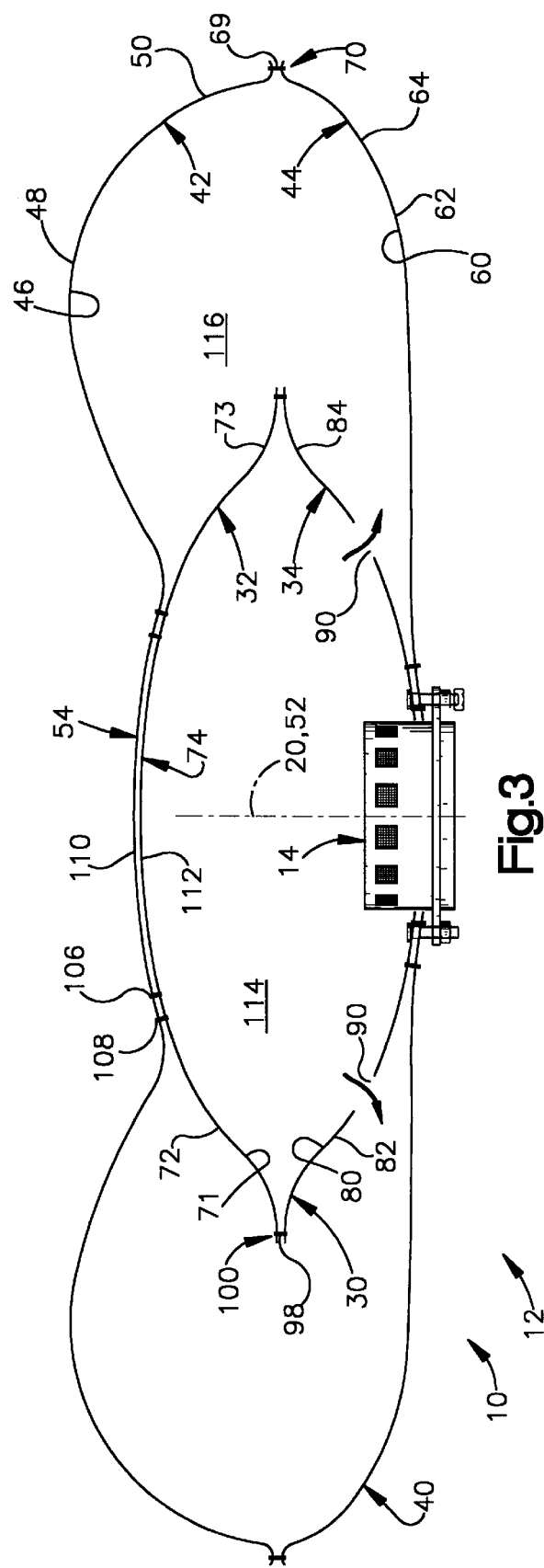

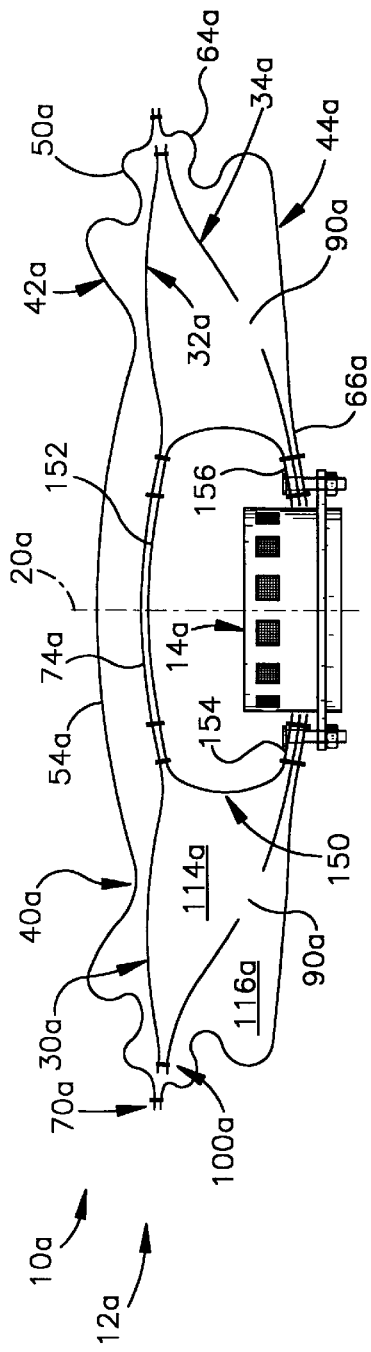
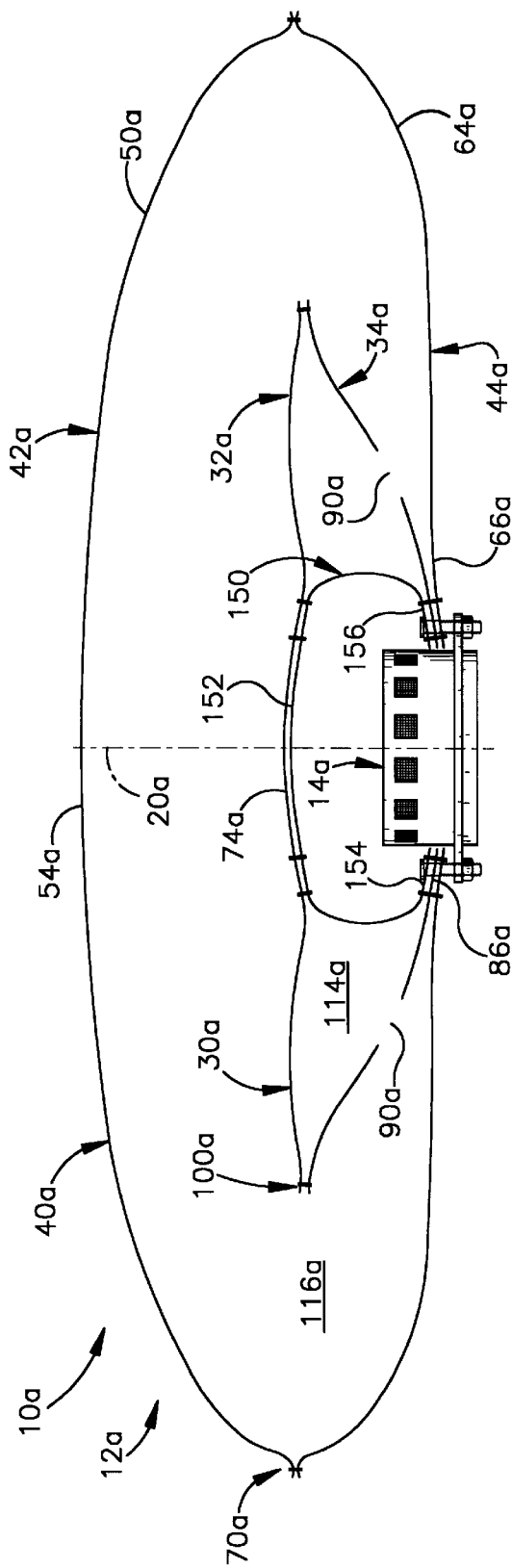

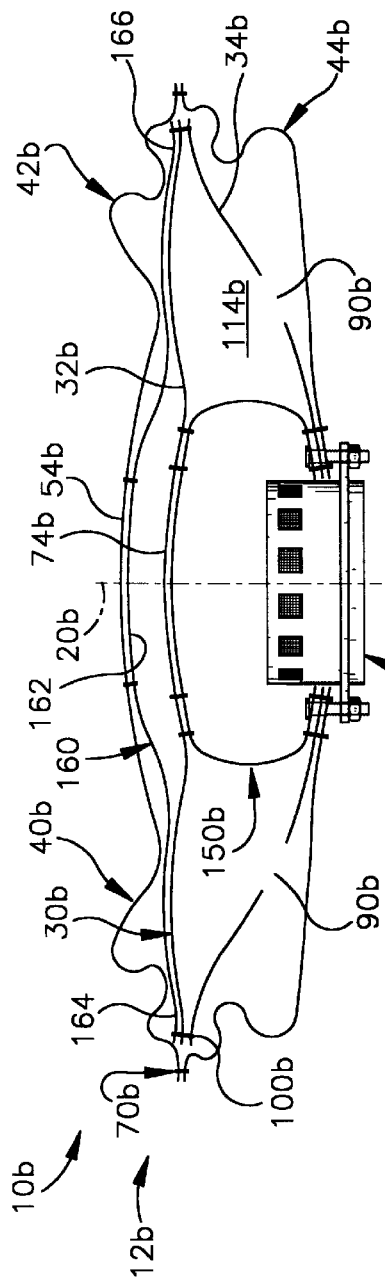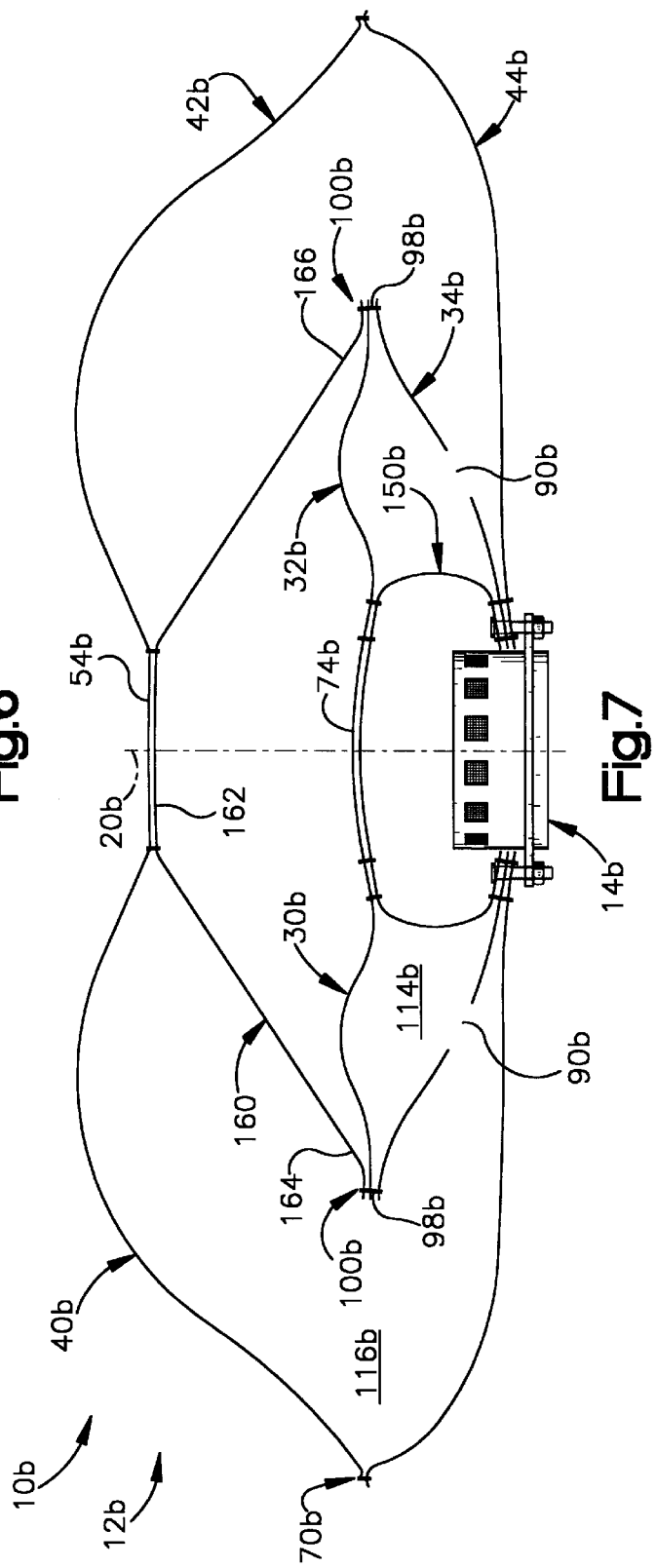

INFLATABLE VEHICLE OCCUPANT PROTECTION DEVICE

BACKGROUND OF THE INVENTION

1. Technical Field

The present invention relates to an inflatable vehicle occupant protection device, such as an air bag. In particular, the present invention relates to an air bag having an inner bag which defines an inflation fluid volume inside an outer bag.

2. Description of the Prior Art

U.S. Pat. No. 5,249,824 discloses an air bag including an expansible inner bag which is located in an internal fluid cavity of an outer bag. The inner and outer bags are connected to each other only at the mouth portion of the air bag, surrounding the inflation fluid opening. The inner bag has a plurality of vent openings for directing inflation fluid from the inner bag into the internal cavity of the outer bag in a direction away from the occupant impact area.

Japanese Patent Application 1-311930 (A) discloses an air bag including an expansible inner bag located in an internal fluid cavity of an outer bag. The inner and outer bags are connected to each other adjacent the occupant impact area, as well as at the mouth portion of the air bag. The inner bag has a plurality of vent openings for directing inflation fluid from the inner bag into the internal cavity of the outer bag in a direction away from the occupant impact area.

SUMMARY OF THE INVENTION

The present invention is an inflatable vehicle occupant protection device for helping to protect an occupant of a vehicle. The device comprises an outer bag including an outer panel and an inner panel sewn together along their outer peripheries by an external seam. The inner panel of the outer bag has a first mouth portion fixable on the vehicle. The outer panel of the outer bag has an occupant contact portion opposite the first mouth portion and movable in a first direction away from the first mouth portion upon inflation of the outer bag. An inner bag located within the outer bag comprises an outer panel and an inner panel sewn together along their outer peripheries by an external seam. The inner panel of the inner bag has a second mouth portion fixable on the vehicle. The outer panel of the outer bag has an outer portion opposite the second mouth portion and movable in the first direction away from the second mouth portion upon inflation of the inner bag.

The second mouth portion of the inner bag has an inflation fluid inlet opening extending around an axis of the second mouth portion for enabling inflation fluid to flow into the inner bag in the first direction. The outer bag is inflated only by inflation fluid which first flows into the inner bag. The inner bag has fluid vent means for directing inflation fluid to flow out of the inner bag and into the outer bag only in directions which are outward from the axis and in a direction away from the occupant contact portion of the outer bag.

In a preferred embodiment, the apparatus further comprises means for securing an area of the outer panel of the inner bag in engagement with an area of the occupant contact portion of the outer bag. The securing means includes means for blocking the flow of inflation fluid between the area of the occupant contact portion of the outer bag and the area of the outer panel of the inner bag.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a schematic view showing the air bag of FIG. 1 in a partially inflated condition;

FIG. 3 is a view similar to FIG. 2 showing the air bag of FIG. 1 in a fully inflated condition;

FIG. 4 is a schematic view similar to FIG. 2 of an air bag module including an air bag constructed in accordance with a second embodiment of the present invention and shown in a partially inflated condition;

FIG. 5 is a view similar to FIG. 4 showing the air bag of FIG. 4 in a fully inflated condition;

FIG. 6 is a schematic view similar to FIG. 2 of an air bag module including an air bag constructed in accordance with a third embodiment of the present invention and shown in a partially inflated condition; and FIG. 7 is a view similar to FIG. 6 showing the air bag of FIG. 6 in a fully inflated condition.

DESCRIPTION OF PREFERRED EMBODIMENTS

Figure 1:
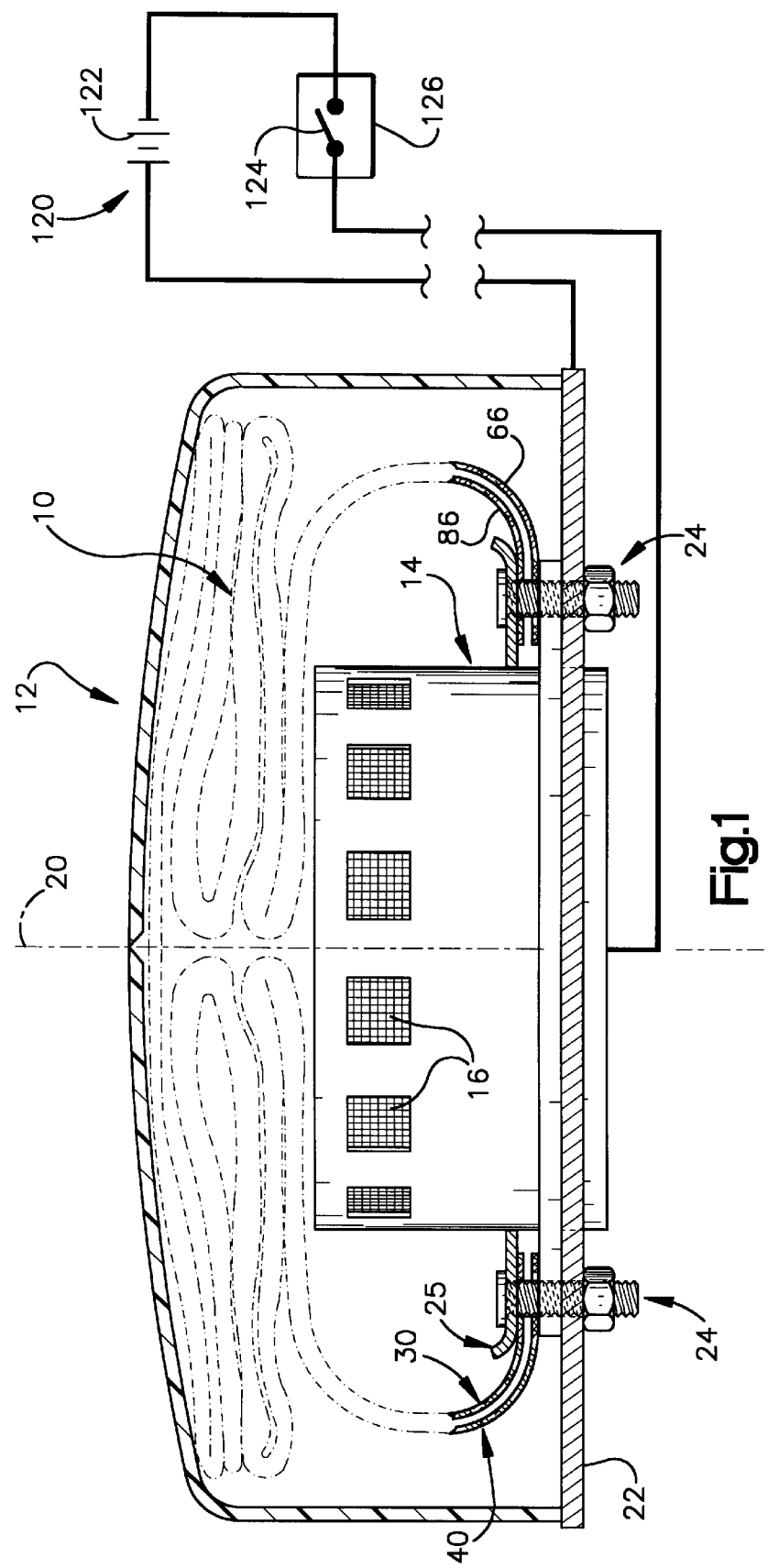
FIG. 1 is a schematic view, partially in section, of an air bag module including an air bag constructed in accordance with the present invention.

The present invention relates to an inflatable vehicle occupant protection device, such as an air bag. In particular, the present invention relates to an air bag having an inner bag which defines an inflation fluid volume inside an outer bag. As representative of the present invention, FIGS. 1–3 illustrate an air bag 10. Other inflatable vehicle occupant protection devices that can be used in accordance with the invention include, for example, inflatable seat belts, inflatable knee bolsters, inflatable head liners or side curtains, and knee bolsters operated by inflatable air bags.

The air bag 10 (FIG. 1) forms a part of a driver side air bag module 12. The module 12 includes an inflator 14 of a known configuration having a plurality of inflation fluid outlets 16 disposed in a circular array around an axis 20 of the module. The module also includes a mounting plate 22, fasteners 24 and a retaining ring 25 for securing the inflator 14 and the air bag 10 to the steering wheel (not shown) of the vehicle. The mounting plate 22 and the retaining ring 25 are, for clarity, not shown in FIGS. 2–7.

The air bag 10 (FIG. 2) includes an inner bag 30 and an outer bag 40 which are sewn together, in a manner described below, to form the completed air bag. The outer bag 40 includes an outer panel 42 (sometimes called a "front panel") which is engageable by the vehicle occupant when the air bag is inflated. The outer bag 40 also includes an inner panel 44 (sometimes called "rear panel") which is connected with the inflator 14 through the fasteners 24 and the restraining ring 25. The outer panel 42 of the outer bag 40 is made from a single panel of sheet material, preferably woven nylon. The outer panel 42 could, alternatively, be made from a different material, such as plastic film. Use of plastic film, in particular, would require the provision of fluid vents for enabling deflation of the air bag after use.

The outer panel 42 of the outer bag 40 has parallel, opposite inner and outer side surfaces 46 and 48 (FIG. 3). The outer panel 42 has a generally circular configuration (as viewed from above in FIGS. 2 and 3, for example) including an outer peripheral portion 50 centered on an axis 52. The axis 52 of the air bag 10 is coincident with the axis 20 of the module 12 when the air bag is installed as a part of the module. The outer panel 42 has an occupant contact portion 54 which is spaced apart axially from the inflator 14 when the air bag 10 is inflated.

The inner panel 44 of the outer bag 40 is substantially similar in configuration to the outer panel 42 of the outer bag. The inner panel 44 is made from the same material as the outer panel 42 and has parallel, opposite inner and outer side surfaces 60 and 62 (FIG. 3). The inner panel 44 has a generally circular configuration including an outer peripheral portion 64 centered on the axis 52. The inner periphery of the inner panel 44 includes a first mouth portion 66 (FIG. 2) of the air bag 10. The mouth portion 66 defines a circular central opening 68 of the inner panel 44 of the outer bag 40.

The outer and inner panels 42 and 44 of the outer bag 40 are sewn to each other with a circular stitching section, or sew line 69. The stitching section 69 extends through the outer peripheral portion 50 of the outer panel 42 and the outer peripheral portion 64 of the inner panel 44. The resulting seam 70 is an "external" seam of the outer bag 40 of the air bag 10. That is, the selvage at the seam 70 is outside of the inflation fluid volume 116 of the outer bag 40 when the air bag 10 is in its finished condition shown in FIGS. 1–3. The seam 70 is not inside of the inflation fluid volume 116 when the air bag 10 is in its finished condition, as would be the case if the seam were an "internal" seam.

The inner bag 30 is similar in configuration to, but substantially smaller than, the outer bag 40. The inner bag 30 includes an outer panel 32 (sometimes called a "front panel") and an inner panel 34 (sometimes called a "rear panel") which are sewn together to form the inner bag. The outer panel 32 of the inner bag 30 is made from a single panel of sheet material, preferably the same material from which the outer bag 40 is made. The outer panel 32 has parallel, opposite inner and outer side surfaces 71, 72 (FIG. 3). The outer panel 32 has a generally circular configuration including an outer peripheral portion 73 centered on the axis 52 of the air bag. The outer panel 32 has an outer portion 74 which is spaced apart axially from the inflator 14 when the air bag 10 is inflated.

The inner panel 34 of the inner bag 30 is substantially similar in configuration to the outer panel 32 of the inner bag. The inner panel 34 is made from the same material as the outer panel 32 and has parallel, opposite inner and outer side surfaces 80 and 82. The inner panel 34 has a generally circular configuration including an outer peripheral portion 84 centered on the axis 52.

The inner periphery of the inner panel 34 includes a second mouth portion 86 of the air bag 10. The second mouth portion 86 defines a circular inflation fluid inlet opening 88 of the inner panel 34 of the inner bag 30. The opening 88 in the inner panel 34 of the inner bag 30 is the same size as, and is aligned with, the opening 68 in the inner panel 44 of the outer bag 40. The inflation fluid inlet opening 88 extends around the axis 52 of the air bag 10.

The inner panel 34 of the inner bag 30 includes fluid vent means. The fluid vent means comprises a plurality of circular fluid direction openings 90 which extend through the material of the panel 34 of the inner bag 30. The fluid direction openings 90 are arranged in a circular array centered on the axis 52.

The outer and inner panels 32 and 34 of the inner bag 30 are sewn to each other with a circular stitching section, or sew line 98. The stitching section 98 extends through the outer peripheral portion 73 of the outer panel 32 and the outer peripheral portion 84 of the inner panel 34. The resulting seam 100 is an "external" seam of the inner bag 30 of the air bag 10. That is, the selvage at the seam 100 is outside of the inflation fluid volume 114 of the inner bag 30 when the air bag 10 is in its finished condition shown in FIGS. 1–3. The seam 100 is not inside of the inflation fluid volume 114 when the air bag 10 is in its finished condition, as would be the case if the seam were an "internal" seam.

The outer bag 40 is sewn to the inner bag 30 at two locations. At one location, a pair of circular stitching sections 102 and 104 secure the first mouth portion 66 of the outer bag 40 to the second mouth portion 86 of the inner bag 30. The stitching sections 102 and 104 are concentric on the axis 52. When the inner bag 30 is thus sewn to the outer bag 40, the vent openings 90 in the inner panel 34 of the inner bag 30 are presented generally toward the inner side surface 60 of the inner panel 44 of the outer bag 40.

At the other location, another pair of circular stitching sections 106 and 108 secure the occupant contact portion 54 of the outer bag 40 to the outer portion 74 of the inner bag 30. Each one of the stitching sections 106 and 108 includes a series of stitches arranged in a circular pattern which extend through the occupant contact portion 54 of the outer bag 40 and the outer portion 74 of the inner bag 30.

The stitching section 108 encloses and defines a circular area 110 of the occupant contact portion 54 of the outer bag 40. The stitching section 108 similarly encloses and defines a circular area 112 of the outer portion 74 of the inner bag 30. The circular area 110 of the occupant contact portion 54 of the outer bag 40 overlies and is in abutting engagement with the circular area 112 of the outer portion 74 of the inner bag 30. (In FIGS. 2 and 3, the circular areas 110 and 112 are, for clarity, shown spaced apart from each other.) The circular stitching section 108, because it is closed, blocks the flow of inflation fluid between the circular area 110 of the occupant contact portion 54 of the outer bag 40 and the circular area 112 of the outer portion 74 of the inner bag 30.

When the assembled air bag 10 is secured in the module 12 (FIG. 1), the inflator outlets 16 are disposed within the inflation fluid volume 114 of the inner bag 30. The inner bag 30 is disposed within the inflation fluid volume 116 of the outer bag 40. The first mouth portion 66 of the outer bag 40 and the second mouth portion 86 of the inner bag 30 are both fixable on a vehicle through the fasteners 24, the retaining ring 25, and the mounting plate 22.

The inflator 14 includes terminals (not shown) which are connected with vehicle electric circuitry 120 (FIG. 1) including a power source 122, which is preferably a vehicle battery and/or a capacitor, and a normally open switch 124. The switch 124 is part of a sensor 126 which senses a vehicle condition indicating the occurrence of a collision. The collision-indicating condition may comprise, for example, sudden vehicle deceleration that is caused by a collision. If the collision-indicating condition is at or above a predetermined threshold level, this indicates the occurrence of a crash having a level of severity for which it is desirable to inflate the air bag 12 or other vehicle occupant protection device to help protect an occupant of the vehicle.

When the sensor 126 senses a collision-indicating condition at or above the predetermined threshold level, the switch 124 closes and the inflator 14 is actuated electrically. The inflator outlets 16 direct inflation fluid into the inflation fluid volume 114 of the inner bag 30.

As the inflation fluid fills the inner bag 30, the inner bag inflates to a condition as shown schematically in FIG. 2. The outer portion 74 of the inner bag 30 moves away from the mouth portion 86 of the inner bag. The occupant contact portion 54 of the outer bag 40, which is connected for movement with the outer portion 74 of the inner bag 30, moves away from the mouth portion 66 of the outer bag.

Inflation fluid flows out of the inner bag 30 through the fluid direction openings 90 in the inner panel 34 of the inner bag. The inflation fluid flows radially outwardly away from the axis 20, and away from the outer portion 74 of the outer panel 34 of the inner bag 30. Thus, the inflation fluid flows out of the inner bag 30 in a direction toward the inner panel 44 of the outer bag 40, not the outer panel 42.

The inflation fluid which flows into the outer bag 40 through the fluid direction openings 90 in the inner bag 30 is the only inflation fluid which flows into the outer bag. The outer bag 40 is inflated only with inflation fluid flowing from the inner bag 30 through the fluid direction openings 90.

The outer bag 40 inflates to a condition as shown schematically in FIG. 3. The outer peripheral portions 50 and 64 of the outer bag 40 expand radially outward as they move away from the mouth portion 66 of the outer bag. The inner bag 30 acts as a tether to limit movement of the occupant contact portion 54 of the outer bag 40 away from the mouth portion 66 of the outer bag. The inner bag 30 thus controls the shape and volume of the inflated air bag 10.

The distance between the inner and outer bags 30 and 40 at the location of the occupant contact portion 54 of the outer bag is effectively zero. There is at most only a minimal, insignificant amount of inflation fluid between the circular area 110 of the occupant contact portion 54 of the outer bag 40 and the circular area 112 of the outer portion 74 of the inner bag 30. At other locations, the material of the outer bag 40 and the material of the inner bag 30 are held apart from each other by the pressure of the inflation fluid between them.

FIGS. 4 and 5 illustrate an air bag 10a which is constructed in accordance with a second embodiment of the present invention. The air bag 10a is similar in construction to the air bag 10 (FIGS. 1–3), and so parts which are similar are given the same reference numerals, with the suffix "a" added for clarity.

In the air bag 10a, the inner bag 30a is constructed with an external seam 100a. The outer bag 40a is constructed with an external seam 70a. The occupant contact portion 54a of the outer bag 40a is not, however, secured to the outer portion 74a of the inner bag 30a.

When the air bag 10a is inflated (FIG. 5), the outer bag 40a inflates away from the inner bag 30a. The occupant contact portion 54a of the outer bag 40a is spaced apart by a substantial distance from the outer portion 74a of the inner bag 30a. Inflation fluid can flow freely, without any substantial restriction, between the occupant contact portion 54a of the outer bag 40a and the outer portion 74a of the inner bag 30a. The outer bag 40a is still, as in the air bag 10, inflated only by fluid flowing out of the inner bag 30a through the outlets 90a in the inner panel 34a of the inner bag.

The air bag 10a includes a tether in the form of a strap 150 for controlling or limiting the inflation movement of the inner bag 30a. The strap 150 has an elongate, rectangular configuration including a central portion 152 and opposite end portions 154 and 156. The central portion 152 of the strap 150 is sewn to the outer portion 74a of the inner bag 30a. The end portions 154 and 156 of the strap 150 are sewn to the mouth portions 86a and 66a of the air bag 10a.

The strap 150 limits movement and inflation of the inner bag 30a to the condition shown in FIG. 5. The strap 150 acts as a tether to limit movement of the outer portion 74a of the inner bag 30a away from the mouth portion 86a of the inner bag.

FIGS. 6 and 7 illustrate an air bag 10b which is constructed in accordance with a third embodiment of the present invention. The air bag 10b is similar in construction to the air bag 10a (FIGS. 4–5), and so parts which are similar are given the same reference numerals, with the suffix "b" added for clarity.

In the air bag 10b, the inner bag 30b is constructed with an external seam 100b. The outer bag 40b is constructed with an external seam 70b. The occupant contact portion 54b of the outer bag 40b is not secured to the outer portion 74b of the inner bag 30b. A tether in the form of a strap 150b controls and limits expansion of the inner bag.

The air bag 10b includes a second tether in the form of a strap 160 for controlling or limiting the inflation movement of the outer bag 40b. The strap 160 has an elongate, rectangular configuration including a central portion 162 and opposite end portions 164 and 166. The central portion of the strap 160 is sewn to the occupant contact portion 54b of the outer bag 40b. The end portions 164 and 166 of the strap 160 are sewn to the inner bag 30b by the stitching section 98b. The seam 100b at the locations where the strap 160 is joined to the inner bag 30b is an external seam, disposed outside of the inflation fluid volume 114b of the inner bag.

Upon actuation of the inflator 14b, inflation fluid flows out of the inner bag 30b through the fluid direction openings 90b in the inner panel 34b of the inner bag. The inflation fluid flows radially outwardly away from the axis 20b, and away from the outer portion 74b of the outer panel 34b of the inner bag 30b. Thus, the inflation fluid flows out of the inner bag 30b in a direction toward the inner panel 44b of the outer bag 40b, not the outer panel 42b. The inflation fluid which flows into the outer bag 40b through the fluid direction openings 90b in the inner bag 30b is the only inflation fluid which flows into the outer bag. The outer bag 40b is inflated only with inflation fluid flowing from the inner bag 30b through the fluid direction openings 90b.

The outer bag 40b inflates away from the inner bag 30b. The strap 160 acts as a tether to limit movement of the occupant contact portion 54b of the outer bag 40b away from the outer portion 74b of the inner bag 30b. The occupant contact portion 54b of the outer bag 40b is spaced apart by a substantial distance from the outer portion 74b of the inner bag 30b. Inflation fluid can flow freely, without any substantial restriction, between the occupant contact portion 54b of the outer bag 40b and the outer portion 74b of the inner bag 30b.

From the above description of the invention, those skilled in the art will perceive improvements, changes and modifications in the invention. For example, the stitching sections 106 and 108 (FIG. 2) could have a closed configuration other than circular, such as an oval or elliptical configuration. Also, only one stitching section might be used to join the occupant contact portion of the outer bag with the outer portion of the inner bag. Such improvements, changes and modifications within the skill of the art are intended to be covered by the appended claims.

Having described the invention, I claim:

1. An inflatable vehicle occupant protection device for helping to protect an occupant of a vehicle, said inflatable device being inflatable by inflation fluid from an inflation fluid source, said inflatable device comprising:

an outer bag having a first mouth portion fixable on the vehicle and having an occupant contact portion opposite said first mouth portion, said occupant contact portion of said outer bag being movable in a first direction away from said first mouth portion of said outer bag upon inflation of said outer bag;

an inner bag located within said outer bag, said inner bag having a second mouth portion fixable on the vehicle and having an outer portion opposite said second mouth portion of said inner bag, said outer portion of said inner bag being movable in said first direction away from said second mouth portion of said inner bag upon inflation of said inner bag; and means for securing an area of said outer portion in engagement with an area of said occupant contact portion, said means including means for blocking the flow of inflation fluid between said area of said occupant contact portion of said outer bag and said area of said outer portion of said inner bag;

said second mouth portion of said inner bag having an inflation fluid inlet opening extending around an axis of said second mouth portion for enabling inflation fluid to flow into said inner bag in said first direction;

said outer bag being inflated only by inflation fluid which first flows into said inner bag, said inner bag having fluid vent means for directing inflation fluid to flow out of said inner bag and into said outer bag only in directions which are outward from said axis and in a direction away from said occupant contact portion of said outer bag.

2. A protection device as set forth in claim 1 wherein said outer bag comprises an outer panel and an inner panel sewn together along their respective outer peripheral portions by an external seam, said inner panel of said outer bag having said first mouth portion of said outer bag and said outer panel of said outer bag having said occupant contact portion;

said inner bag comprising an outer panel and an inner panel sewn together along their respective outer peripheral portions by an external seam, said inner panel of said inner bag having said second mouth portion and said outer panel of said inner bag having said outer portion of said inner bag.

3. A protection device as set forth in claim 1 wherein said means for blocking the flow of inflation fluid comprises a closed non-linear stitching section which extends through said occupant contact portion of said outer bag and said outer portion of said inner bag, said closed non-linear stitching section enclosing and defining said area of said occupant contact portion of said outer bag and said area of said outer portion of said inner bag which overlie each other in abutting engagement.

4. An inflatable vehicle occupant protection device for helping to protect an occupant of a vehicle, comprising:

an outer bag comprising an outer panel and an inner panel sewn together along their respective outer peripheral portions by an external seam, said inner panel of said outer bag having a first mouth portion fixable on the vehicle, said outer panel of said outer bag having an occupant contact portion opposite said first mouth portion, said occupant contact portion being movable in a first direction away from said first mouth portion upon inflation of said outer bag;

an inner bag located within said outer bag, said inner bag comprising an outer panel and an inner panel sewn together along their respective outer peripheral portions by an external seam, said inner panel of said outer bag having a second mouth portion fixable on the vehicle, said outer panel of said inner bag having an outer portion opposite said second mouth portion, said outer portion of said inner bag being movable in said first direction away from said second mouth portion upon inflation of said inner bag; and said second mouth portion of said inner bag having an inflation fluid inlet opening extending around an axis of said second mouth portion for enabling inflation fluid to flow into said inner bag in said first direction;

said outer bag being inflated only by inflation fluid which first flows into said inner bag, said inner bag having fluid vent means for directing inflation fluid to flow out of said inner bag and into said outer bag only in directions which are outward from said axis and in a direction away from said occupant contact portion of said outer bag; and a tether disposed within said inner bag for limiting movement of said outer portion of said inner bag away from said second mouth portion of said inner bag, said occupant contact portion of said outer bag being spaced apart from said outer portion of said inner bag when said protection device is inflated; and a first tether disposed within said inner bag for limiting movement of said outer portion of said inner bag away from said second mouth portion of said inner bag; and a second tether connected between said inner bag and said outer bag for limiting movement of said outer bag away from said inner bag when said protection device is inflated, said second tether having a central portion sewn to said occupant contact portion of said outer bag and having opposite end portions sewn to said external seam of said inner bag.

5. An inflatable vehicle occupant protection device for helping to protect an occupant of a vehicle, comprising:

an outer bag comprising an outer panel and an inner panel sewn together along their respective outer peripheral portions by an external seam, said inner panel of said outer bag having a first mouth portion fixable on the vehicle, said outer panel of said outer bag having an occupant contact portion opposite said first mouth portion, said occupant contact portion being movable in a first direction away from said first mouth portion upon inflation of said outer bag;

an inner bag located within said outer bag, said inner bag comprising an outer panel and an inner panel sewn together along their respective outer peripheral portions by an external seam, said inner panel of said outer bag having a second mouth portion fixable on the vehicle, said outer panel of said inner bag having an outer portion opposite said second mouth portion, said outer portion of said inner bag being movable in said first direction away from said second mouth portion upon inflation of said inner bag; and said second mouth portion of said inner bag having an inflation fluid inlet opening extending around an axis of said second mouth portion for enabling inflation fluid to flow into said inner bag in said first direction;

said outer bag being inflated only by inflation fluid which first flows into said inner bag, said inner bag having fluid vent means for directing inflation fluid to flow out of said inner bag and into said outer bag only in directions which are outward from said axis and in a direction away from said occupant contact portion of said outer bag; and means for securing an area of said outer portion of said inner bag in engagement with an area of said occupant contact portion, said means for securing including means for blocking the flow of inflation fluid between said area of said occupant contact portion of said outer bag and said area of said outer portion of said inner bag.

6. A protection device as set fort in claim 5 wherein said means for blocking the flow of inflation fluid comprises a closed non-linear stitching section which extends through said occupant contact portion of said outer bag and said outer portion of said inner bag, said closed non-linear stitching section enclosing and defining said area of said occupant contact portion of said outer bag and said area of said outer portion of said inner bag which overlie each other in abutting engagement.

7. A protection device as set forth in claim 5 wherein said fluid vent means comprises a plurality of openings in said inner panel of said inner bag.

8. An inflatable vehicle occupant protection device for helping to protect an occupant of a vehicle, comprising:

an outer bag comprising an outer panel and an inner panel sewn together along their respective outer peripheral portions by an external seam, said inner panel of said outer bag having a first mouth portion fixable on the vehicle, said outer panel of said outer bag having an occupant contact portion opposite said first mouth portion, said occupant contact portion being movable in a first direction away from said first mouth portion upon inflation of said outer bag;

an inner bag located within said outer bag, said inner bag comprising an outer panel and an inner panel sewn together along their respective outer peripheral portions by an external seam, said inner panel of said outer bag having a second mouth portion fixable on the vehicle, said outer panel of said inner bag having an outer portion opposite said second mouth portion, said outer portion of said inner bag being movable in said first direction away from said second mouth portion upon inflation of said inner bag; and said second mouth portion of said inner bag having an inflation fluid inlet opening extending around an axis of said second mouth portion for enabling inflation fluid to flow into said inner bag in said first direction;

said outer bag being inflated only by inflation fluid which first flows into said inner bag, said inner bag having fluid vent means for directing inflation fluid to flow out of said inner bag and into said outer bag only in directions which are outward from said axis and in a direction away from said occupant contact portion of said outer bag; and a tether disposed within said inner bag for limiting movement of said outer portion of said inner bag away from said second mouth portion of said inner bag, said occupant contact portion of said outer bag being spaced apart from said outer portion of said inner bag when said protection device is inflated.

9. A protection device as set forth in claim 8 wherein said tether has a central portion sewn to said outer portion of said inner bag and opposite end portions sewn to said second mouth portion of said inner bag.

* * * * *